United States Patent [19]

Short, III

[11] Patent Number: 4,470,048

[45] Date of Patent: Sep. 4, 1984

[54] RANGE PROFILE TARGET CLASSIFIER

[75] Inventor: Robert D. Short, III, Littleton, Mass.

[73] Assignee: Sperry Corporation, New York, N.Y.

[21] Appl. No.: 363,189

[22] Filed: Mar. 29, 1982

[51] Int. Cl.³ .......................... G01S 7/30; G01S 13/78
[52] U.S. Cl. ................................ 343/5 SA; 367/100; 382/34
[58] Field of Search ................... 343/5 SA, 5 CM, 17; 382/34, 42; 367/100

[56] References Cited

U.S. PATENT DOCUMENTS

| 3,716,823 | 2/1973 | Thompson et al. | 343/5 SA |
| 3,913,099 | 10/1975 | Wehner et al. | 343/5 SA |
| 3,947,833 | 3/1976 | Eckstein, Jr. | 382/34 |
| 4,396,903 | 8/1983 | Habicht et al. | 382/42 |

Primary Examiner—Maynard R. Wilbur
Assistant Examiner—Gilberto Barroón, Jr.
Attorney, Agent, or Firm—Howard P. Terry

[57] ABSTRACT

A range profile classifier wherein targets are identified based on the sequences of their received range profiles. Individual looks at a target are taken and it is assumed that the aspect angle of observation changes by no more than a predetermined amount. Correlations are made with reference data, which correlations are then summed recursively according to preselected restrictive criteria to obtain the most likely sequence corresponding to the target for which reference data is stored in the range profile target classifier.

13 Claims, 9 Drawing Figures

4,470,048

RANGE PROFILE TARGET CLASSIFIER

BACKGROUND OF THE INVENTION

1. Field of the Invention

The subject invention pertains to the field of target detection and more particularly to a device for classifying targets based on changes of profile with aspect.

2. Description of the Prior Art

An important feature in the identification of unknown targets for both radar as well as sonar applications is the range profile of a target. For radar systems the target range profile is determined by the backscattered waveform as a function of radial distance from the radar antenna. The location of scattering centers on the target will cause peak responses in the waveform that correspond to the distance of the scattering center from the radar antenna. The location of the scattering centers on a target is determined by the shape and structure of the target. Different targets will therefore have different scattering center locations and therefore distinct range profiles. A target's profile will also change as a function of the viewing angle with respect to the radar, otherwise known as the aspect angle. Therefore a very large number of target profiles will need to be stored to take account of each possible aspect angle.

The present invention provides a method and apparatus useful in the processing of sequentially obtained target profile data in such manner as to efficiently utilize the profile data to classify and identify the target under observation.

SUMMARY OF THE INVENTION

In the preferred form of the range profile target classifier, disclosed in greater detail below, received range profile signals are coupled to a series of range profile correlators wherein the returned range profile data signals are compared to a plurality of reference profile data signals, each of the profile correlators corresponding to a predetermined target and each of the reference profile data signals corresponding to a preselected aspect of the predetermined target. The profile correlator then provides a correlation number that is representative of the match between the received and reference range profile data signals. These correlation numbers are coupled to individual sequence correlators, each of the sequence correlators corresponding to one of the profile correlators. The sequence correlators provide a signal representative of the maximum sum of the correlation numbers obtained from successive looks at the target where the sums are selected from those looks having aspect angles changing by no more than an integral number of predetermined aspect angle increment and having no more than one possible aspect angle for each of the looks. The maximum sums are then coupled to a maximum detector which selects the greatest of these maximum sums.

In one embodiment of the invention the apparatus further contains means to indicate the nature of the sequence that generated the maximum sum, in addition to the maximum sum itself.

DESCRIPTION OF THE PREFERRED EMBODIMENT

Figures 1, 5:
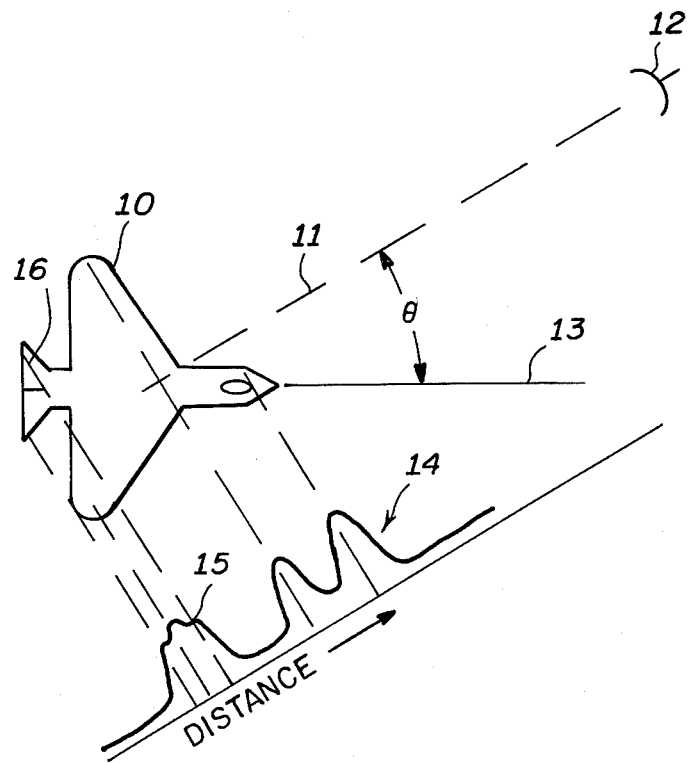
FIG. 1 is a diagram useful in the explanation of the operation of the present invention.
FIG. 5 is a diagram useful in explaining the operation of the present invention.

Refer now to FIG. 1 in which target 10 is illuminated with radar signals 11 originating from antenna 12 at an angle $\theta$ shown with respect to the longitudinal axis 13 of target 10. Although shown as a single dashed line for clarity, the illuminating radar electromagnetic energy will have a finite beam width wide enough to illuminate the entire target in its widest cross section. Energy reflected from target 10 will be returned along path 11 and received by antenna 12. The resulting backscattered waveform returned from the target is shown as waveform 14 having peaks corresponding to scattering centers on target 10. For example, peak 15 will result from the radar signal returned from the tail of the target airplane 16. Waveform 14 is shown as an amplitude of the backscattered waveform with respect to distance, or in other words, range.

Figure 2:
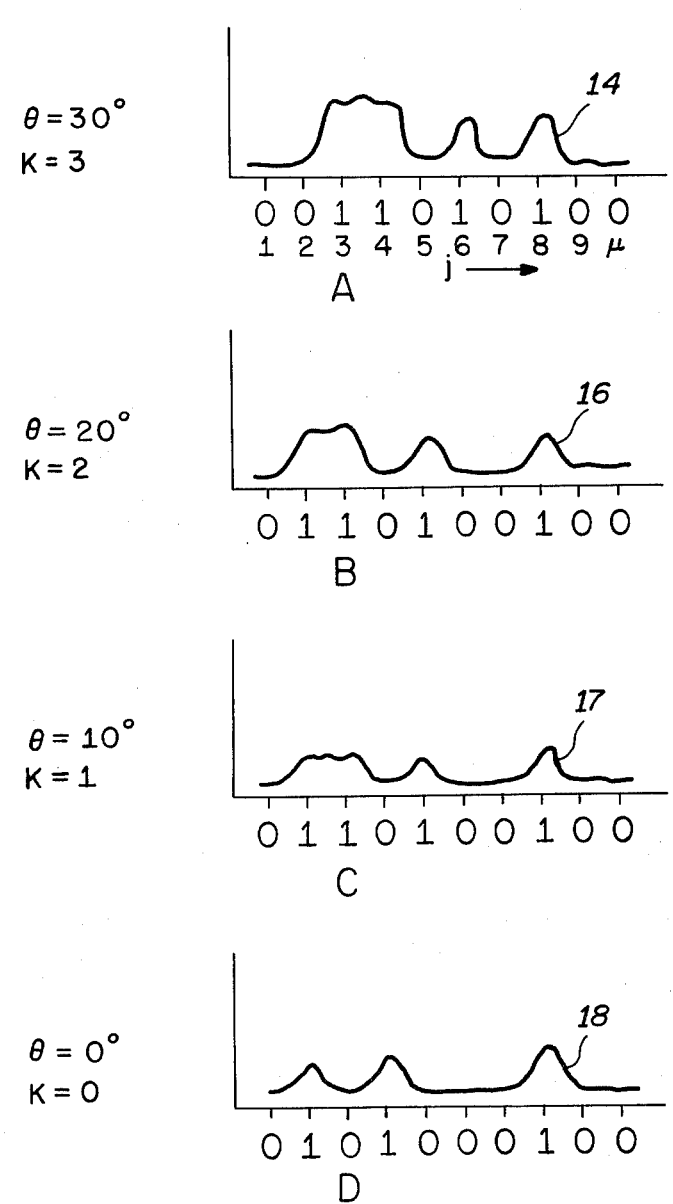
FIGS. 2a, 2b, 2c, and 2d are graphs of range profile data suitable for use in the range profile classifier of the present invention.

As the angle $\theta$ changes, caused either by motion of the target, motion of the antenna, or a combination of the two, it is clear that the viewing angle or aspect angle will change and therefore the range profile will also change. Referring to FIG. 2, there is shown a sequence of range profiles obtained from varying aspect angles $\theta$ of the target 10 of FIG. 1. Beginning at an angle of $\theta = 30°$, and decreasing $\theta$ at 10° intervals, the corresponding waveforms 14, 16, 17 and 18 change accordingly. The resulting range profile sequence shown in FIG. 2 is uniquely related to the target structure and may, therefore, be used to enhance the correct identification of the unknown target.

In order to make use of this additional sequence information it is necessary to be able to quickly and efficiently process a large quantity of information to determine a known structure to which such a sequence most likely corresponds. The known sequence having the highest correlation to the profile sequence received from an actual but unknown target may thus be used to identify the unknown target.

Figure 3:
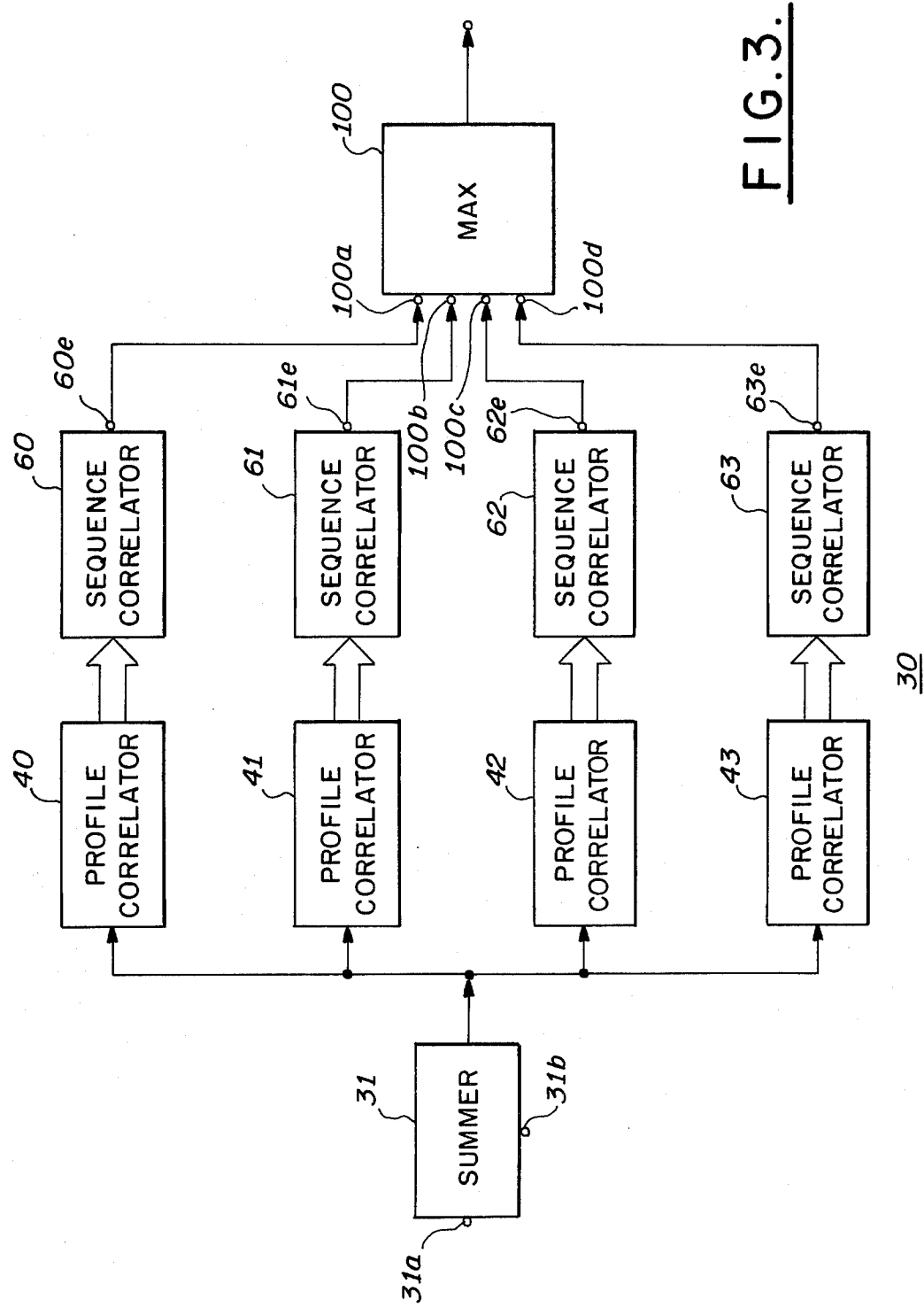
FIG. 3 is a block diagram of a range profile classifier in accordance with the present invention.

Referring to FIG. 3, a range profile target classifier 30 may comprise a summer 31 having summing terminals 31a and 31b, and an output terminal that is coupled in parallel to profile correlators 40, 41, 42, and 43 which are in turn coupled to sequence correlators 60, 61, 62, and 63, respectively. The output terminals of 60a, 61a, 62a, and 63a of sequence correlator 60 and 63 respectively are coupled to the input terminals 100a, 100b, 100c, and 100d, of maximum detector 100, respectively.

Figure 4:
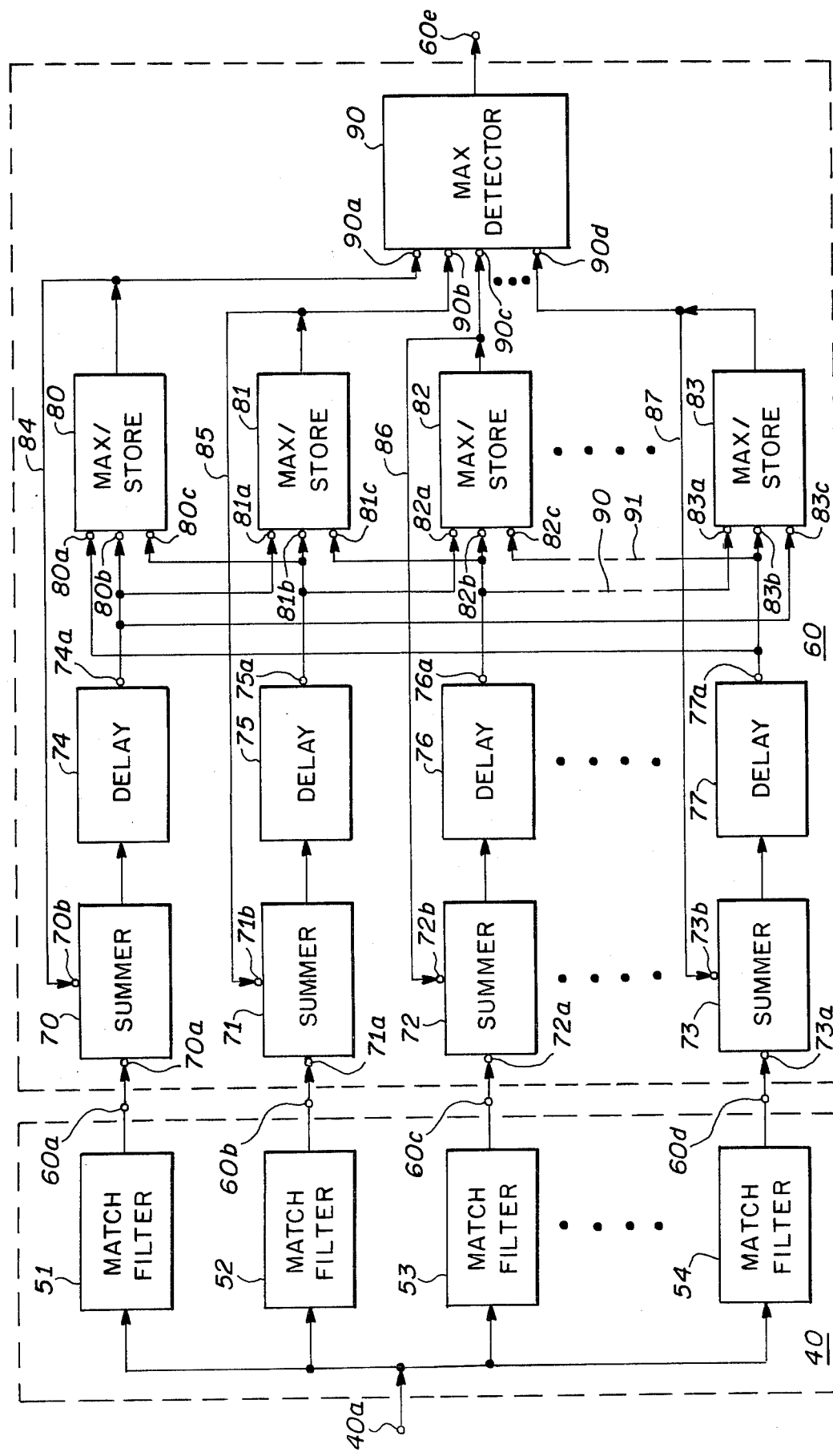
FIG. 4 is a block diagram of individual profile correlators and sequence correlators suitable for use in the range profile target classifier of FIG. 3.

Referring now to FIG. 4, a profile correlator 40 comprises match filters 51, 52, 53, and 54 coupled in parallel to input terminal 40a. As will be described further herein below, profile correlators 41, 42, and 43 will have a similar structure to that of profile correlator 40. The respective output terminals of match filters 51, 52, 53 and 54 are coupled to input terminals 60a, 60b, 60c, and 60d, as shown. Sequence correlator 60 comprises a series of n parallel circuits each including a summer, a delay line and a maximum/store circuit having appropriate intercoupling therebetween. Sequence correlator 60 comprises summers 70, 71, 72, and 73, which are coupled in turn to delay lines 74, 75, 76 and 77, respectively. It will be recognized that any number of match filters and associated summers, delay lines and maximum/store circuits may be used as required for a particular target and the sequences desired to be identified.

Maximum/store circuit 80 is coupled at a first terminal 80a to the output terminal 77a of delay line 77. A second terminal of maximum/store circuit 80, terminal 80b, is coupled to output terminal 74a of delay line 74 while a third input terminal 80c of maximum/store circuit 80 is coupled to output terminal 75a of delay line 75. Maximum/store circuit 81 is coupled in a similar manner to maximum/store circuit 80 having first, second and third terminals 81a, 81b, and 81c, coupled respectively to delay line terminals 74a, 75a, and 76a. Maximum/store circuit 82 has first, second and third terminals, 82a, 82b and 82c coupled respectively to delay line terminals 75a, 76a and 77a. The remaining maximum/store circuit shown, 83, is coupled in a manner similar to the maximum/store circuits 80, 81, and 82, having first, second and third terminals, 83a, 83b, and 83c, coupled respectively to delay line output terminals 76a, 77a, and 74a, respectively. The output signal of maximum/store circuit 80 is coupled to a first input terminal 90a of maximum detector 90 and further coupled by lead 84 to a second summing input terminal 70b of summer 70. The output terminal of maximum/store circuit 81 is coupled to an input terminal 90b of maximum detector 90 and is further coupled via lead 85 to a second summing input terminal 71b of summer 71. The output terminal of maximum/store circuit 82 is coupled to a third input terminal 90c of maximum detector 90, and is further coupled via lead 86 to a second input summing terminal 72b of summer 72. The $k^{th}$ maximum/store circuit 83, which in the instant invention is the fourth such unit, has an output terminal which is coupled to output terminal 90d of maximum detector 90 and is further coupled via lead 87 to a second summing input terminal 73b of summer 73.

It will be recognized that any number of matched filters and the associated summers, delay lines and maximum/store circuits may be used as required for a particular target and sequence it is desired to identify. In the embodiment shown in FIG. 4, k has been selected to equal 4 and the $k^{th}$ or the fourth row of match filter, summer, delay and maximum/store circuits are coupled to the k−1, or third row maximum/store circuit 82 via leads 90 and 91 which are shown in phantom. Should it be desired to be able to identify a sequence having more than four profiles for a given target, then additional circuitry would be needed coupled between the row of circuitry that includes maximum/store circuit 82 and that which contains the maximum/store circuit 83 which rows would be coupled according to the pattern described above and as will be further explained hereinbelow.

In the instant invention profile sequence information is efficiently processed using a recursive method and apparatus adapted thereto. The known profile sequence having the highest correlation to the received profile sequence of the target may thus be used to identify the unknown target. Important parameters for range profile data includes the location of the peaks; thus a simple profile representation which preserves the location of the peaks may be substituted for the complete profile for the sake of efficient implementation. Referring to FIG. 2, this representation may be obtained by taking $\mu$ samples over the range extent of the longest range profile. Each sample is identified by a 1 or 0 depending upon whether or not a peak above a predetermined threshold is present in the range profile. In FIG. 2, ten samples are taken, i.e. $\mu = 10$, the samples being taken at 10 distinct ranges represented by J, where J varies from 1 through 10.

As discussed above, it is necessary to find the maximum correlation of the profile sequence of the target being studied with known profile sequences generated from a library of target profiles stored in the match filters. In the instant invention this is done efficiently by recognizing that aspect changes for each look must be continuous. Therefore, the range profile transition between looks is constrained to a few possible profiles For the purposes of explanation the aspect change as shown in FIG. 1 will be assumed to be with respect to azimuth or $\theta$, only. It will, however, be clear to those skilled in the art that aspect changes with respect to pitch and roll are also contemplated by the scope of the invention.

The number of looks taken, for example, by a radar is equal to N. Each individual look may be represented by n. Thus in the case of a pulsed radar the first pulse of a given series would correspond to n=1, while subsequent pulses continue until n=N. Assuming as stated above, that aspect changes are in the azimuth only, a collection of profiles for each target will be received for $\theta = k\Delta\theta$, where k=0, 1, 2, ... K−1, where K=360°/$\Delta\theta$ and where $\Delta\theta$ is the maximum aspect change angle that is assumed may occur between looks. As shown in FIG. 2, $\Delta\theta = 10°$ over a range of k's from 0 to 3. We define $k_n$ to correspond to the test profile at look n, providing an index thereof. Since the aspect changes from look to look must be continuous, the range profile transition between looks may therefore be constrained such that $|k_{n+1} - k_n|$ is $\leq 1$. It will be recognized, however, that the change in aspect between looks may be any integral number of a predetermined aspect angle increment, where the maximum number of increments is limited by the maximum expected charge in aspect between looks. The index n thus corresponds to a position in a sequence of profiles. The maximum sequence correlation for a given target may be computed as a correlation over N looks and K profiles.

The maximum sequence correlation for a given target may be found using a dynamic programming procedure. Let $q_{n,k}$ denote the range profile correlation of the $n^{th}$ look with the $k^{th}$ test profile. In other words, if $f_n(j)$ is the $n^{th}$ received range profile and $h_k(j)$ is the $k^{th}$ test profile, $$q_{n,k} = \sum_{j=1}^{\mu} r_n(j) h_k(j) \tag{1}$$

Referring to FIG. 2a, the received profile $r_n(j)$ is 0011010100. If, for example, the test profile $h_k(j)$ were to be 0001010100, Equation 1 would yield a value of $q_{n,k} = 3$. If $r_n(j)$ and $h_k(j)$ were identical, in the case of FIG. 2a a value of $q_{n,k} = 4$ would be obtained. It is, however, necessary to find the maximum sequence correlation for all N looks, $Q_{max}$, which may be found as follows:

$$Q_{max} = \underset{\{k_n\}}{\text{Max}} \sum_{n=1}^{N} q_{n,k_n} \qquad (2)$$

where $\{k_n\}$ is the set of permissible range profile sequences. Equation 2 sums all $q_{n,k_n}$ for N looks and then finds the maximum sum for the $k_n$ set of permissible range profile sequences.

Equation 2 and the general operation of the invention may be better understood by reference to FIG. 5 which shows an array of correlation coefficients $q_{n,k}$ as defined in Equation 1 arranged so that by looking down a selected column, for example, where the look number n=1, the correlation coefficients having any one of four different values of k (for aspect), i.e., 1 to 4 are obtained. The individual $q_{n,k}$ correlation coefficients shown in FIG. 5 may be considered to be nodes. In order to obtain the most likely sequence of profiles, paths may be selected from node to node where the correlation coefficients obtained at each node are summed together. The sums of the correlation coefficients for the selected paths may then be compared, and the highest sum of correlation coefficients will result from the path selected corresponding to the most likely range profile sequence. Many paths are obtainable subject to the constraints previously discussed, namely: (1) only one aspect may be observed at a given look, and (2) each aspect change from node to node can be no greater than ±1. Thus by way of example path 200 as represented by the arrow passes through the nodes $q_{1,1}$, $q_{2,2}$ and $q_{3,3}$. In this particular path the look and aspect change together. Path 201, however, passes through points $q_{1,1}$, $q_{2,1}$ and $q_{3,1}$, thus the aspect does not change from look to look. Path 202, on the other hand, passing through points $q_{1,1}$, $q_{1,2}$, $q_{1,3}$, and $q_{1,4}$ would not be permissible since it occupies four possible aspects at a given look which violates the first constraint. Similarly, path 203 which goes from node $q_{1,1}$ to $q_{2,3}$ to $q_{2,2}$ would also not be permissible since it violates the second constraint because the change from look 1 to look 2 would involve a change of more than +1 in aspect. There are thus a set of permissible range profile sequences; furthermore, it can be seen that the aspect selected will be a function of the look and is therefore referred to as $k_n$. Equation 2 and the apparatus and method to be described hereinbelow implement the operation described for FIG. 5.

According to the present invention, Equation 2 is solved recursively according to the principles of dynamic programming by defining $$Q_{n,k} = q_{n,k} + \text{Max}\{Q_{n-1, k+\nu}\} \qquad (3)$$
$$\nu = 1, 0, -1$$

where $\nu$ has been restricted to be an integer having the value of 1, 0, or $-1$ and $Q_{1,k} = q_{1,k}$. The solution to Equation 2 is thus found to be:

$$Q_{max} = \text{Max}\{Q_{N,k}\} \qquad (4)$$
$$1 \leq k \leq K$$

In addition to obtaining $Q_{max}$, the profile sequence may be determined for possible target identification, by storing intermediate decisions from Equation (3). Let $\nu_{n,k}$ correspond to the value of $\nu$ which maximizes $Q_{n-1, k+\nu}$ in Equation (3). Then the most likely aspect sequence determined by $Q_{max}$ is given by $$k^*_{n-1} = K^*_{n+\nu_{n,k}} \qquad (5)$$

where $k^*_N$ corresponds to $$\underset{1 \leq k \leq K}{\text{Max }} Q_{N,k}$$

Referring again to FIG. 3, range profile data, $r_n(j)$ is applied to summer input 31a wherein it is summed with a d.c. bias signal applied to input terminal 31b. The d.c. bias is typically a negative bias signal which is added to the range profile prior to processing to introduce a penalty for correlating a profile peak where no peak occurs in the range profile data. Assume, for example, the target in the library has a binary profile as previously discussed for FIG. 2a, namely, 0011010100. According to Equation 1, for a perfect match the received target profile would yield $q_{n,k}=4$. However, a received profile of 1111111111 would also yield a $q_{n,k}=4$ and thus would also appear to be a perfect match with the reference. It can be seen, by this example, that no penalty is introduced for the introduction of peaks, where in fact no peak exists in the library profile. A negative d.c. bias may be added to the incoming video such that where a peak exists in the incoming video a signal of +1 is obtained and where no peak exists a signal of −1 is obtained. The incoming video signal 0011010100 is then converted to −1−111−11−11−1−1. Such a signal when correlated with a reference signal $h_k(j)$ having all ones will yield a correlation number of zero. The identical correlation number, however, will still yield a correlation number of 4, indicative of a perfect match with the number 0011010100. Thus, the correlation providing a better match will in fact yield the higher correlation number. In actual practice, a voltage of two volts, for example, may be utilized to correspond to binary 1's applied to terminal 3a. Thus, range profile peaks at terminal 31a having a value of 2 volts can be summed with a bias voltage of −1 volt at terminal 31b such that the output of summer 31 will now yield 1 volt corresponding to peaks of one in the original video data and −1 volt corresponding to zeroes in the original received data.

The summed signal from summer 31 may then be applied to profile correlators 40, 41, 42, and 43. Each profile correlator provides correlation numbers for an individual target, viewed from a plurality of aspect angles. The correlators are comprised of a group of matched filters, for example, 51–54, each of which is used to provide a correlation between the received range profile data and a test profile stored for a given target at a given aspect angle. Matched filters may comprise any circuitry well known in the art, for example, digital comparators in the case where range profile data is processed in digital format.

Sequence correlators 60, 61, 62 and 63 provide continuous processing of the correlation coefficients computed by match filters 51–54 to provide a correlation number for the most likely sequence of range profiles received for a series of test profiles. Each of these correlation numbers are then compared in maximum detector 100 which then selects the sequence of profiles corresponding to a target that most closely matches the range profile data received from an actual target.

In operation, sequence correlators 60-63 are identical to sequence correlator 60 as shown in FIG. 4 and provide sequence correlation for each profile correlator. Each profile correlator will correspond to a given expected target, for example, different models of aircraft, expected to be observed for identification by the present invention.

Refer to FIG. 4. In operation, each sequence correlator, such as 60, receives the correlation number from each of matched filters 51-54 and adds it to the largest of the correlation numbers determined from various aspects for the previous looks. These correlation numbers, each corresponding to a given aspect, are added to one of the possible cumulative sums from the previous looks and the maximum sum and its corresponding sequence is selected. At each step, less then maximum sums are eliminated since the invention will select the largest sum up to that step. Profile correlator 60 of FIG. 4 thus sequentially sums up along each possible aspect path as previously described for FIG. 5 to compute the maximum correlation value, which value corresponds to a target having the most likely sequence of aspects that correspond to the given profile data. Each profile correlator and sequence correlator combination thus correspond to a specific potential target. FIG. 3 has been limited to four such different types of targets although it will be clear to those skilled in the art that any number of possible targets may be identified by the present invention through the addition or deletion of additional profile correlator and sequence correlator units. Similarly, for ease of explanation, each profile correlator and sequence correlator as shown in FIG. 4 can select from one of four possible aspects for a given target as desired to be identified. It will be clear to those skilled in the art that through the proper coupling of components of sequence correlator 60, additional aspects of a target may be considered as indicated by the dots in FIG. 4. For the purposes of explanation, however, discussion of the operation of profile correlator 40 and sequence correlator 60 will be limited to the instance of four possible aspects.

In operation each match filter such as 51, 52, 53 and 54 will provide a correlation number as previously described for a given set of range profile data. Each one of the correlation numbers for match filters 51-54 are coupled respectively to summers 70, 71, 72 and 73. Summers 70-73 have a and b terminals such as terminal 70a and 70b for adding the current range profile data with cumulative maximum sums calculated from previous looks. Thus, assuming the first look of a sequence, correlation numbers will be summed with zero and coupled at the output of summers 70-73 to input terminals of delay units 74-77, respectively. Delay units 74-77 provide a delay corresponding to the time between each look. When the second look is received, data corresponding to look 2, i.e., n=2 is coupled to the match filters which then provide correlations with the preselected profiles contained within the match filters and a correlation number which is coupled in turn in summers 70-73. On this second look, the previous information from look n=1 will be transferred to maximum/store circuits 80, 81, 82 and 83 which are arranged in such manner as to compare correlation numbers from adjacent matched filter series. Maximum/store circuits 80-83 select the largest or maximum correlation number coupled to their input terminals, and store that number for further processing as is described in detail hereinbelow. Thus, for example, maximum/store circuit 80 will compare correlation numbers received from delay 74 to those received from delay 77 and delay 75 and select and store the largest of the three.

Similarly, maximum/store circuit 81 compares data originating from delays 74, 75 and 76, determines the maximum of those three numbers, and stores that maximum for future use. In like manner, maximum/store circuit 82 processes data originating from delays 75, 76 and 77, and maximum/store circuit 83 processes data originating from delays 74, 77, and 76. The selected numbers determined to be a maximum at each maximum/store circuit 80 through 83 are then fed back to the b terminals of their respective summers 70, 71, 72 and 73 where they are added to the present correlation number. The resulting sum is, in turn, coupled to respective delays 74, 75, 76 and 77. For the third look, range profile data is coupled to the match filters 51 through 54 which generate correlation numbers representative of the match between the incoming range data and the library target aspect profile. This correlation number is coupled to summers 70 through 73 at their a terminals and added to the maximum correlation number sum obtained from previous looks n=1 and n=2 which propagated to maximum/store circuits 80 through 83 after having been delayed in delays 74 through 77 respectively. The process continues for each additional look until n=N.

As the process continues maximum detector 90 continuously selects the maximum correlation sum computed by summer 70 through 73, in conjunction with delay 74 through 77 and maximum/store circuits 80 through 83. This maximum is then coupled to sequence correlator output terminal 60e. Similar numbers are presented to the output terminals of sequence correlators 61 through 63, namely 61e, 62e and 63e. It will be recalled that the sum coupled to output terminal 60e corresponds to one particular type of target while the sums coupled to maximum detector 100 from output terminal 61e, 62e and 63e all correspond to three other types of targets. Maximum detector 100 thus selects the highest correlation sum which corresponds to a particular target and thereby identifies the type of target being observed.

Maximum detector 100 as well as maximum detector 90 may be constructed according to principles well known in the art. Maximum detector 100 may be constructed to both identify the most likely target as well as provide an indication of the correlation sum if desired. Maximum detector 90 is constructed primarily to select the highest of the numbers presented to its input. The operation of the sequence correlator according to the foregoing, therefore, satisfies the requirements of Equation 2 and selects the most likely path that is described for FIG. 5.

Figure 6:
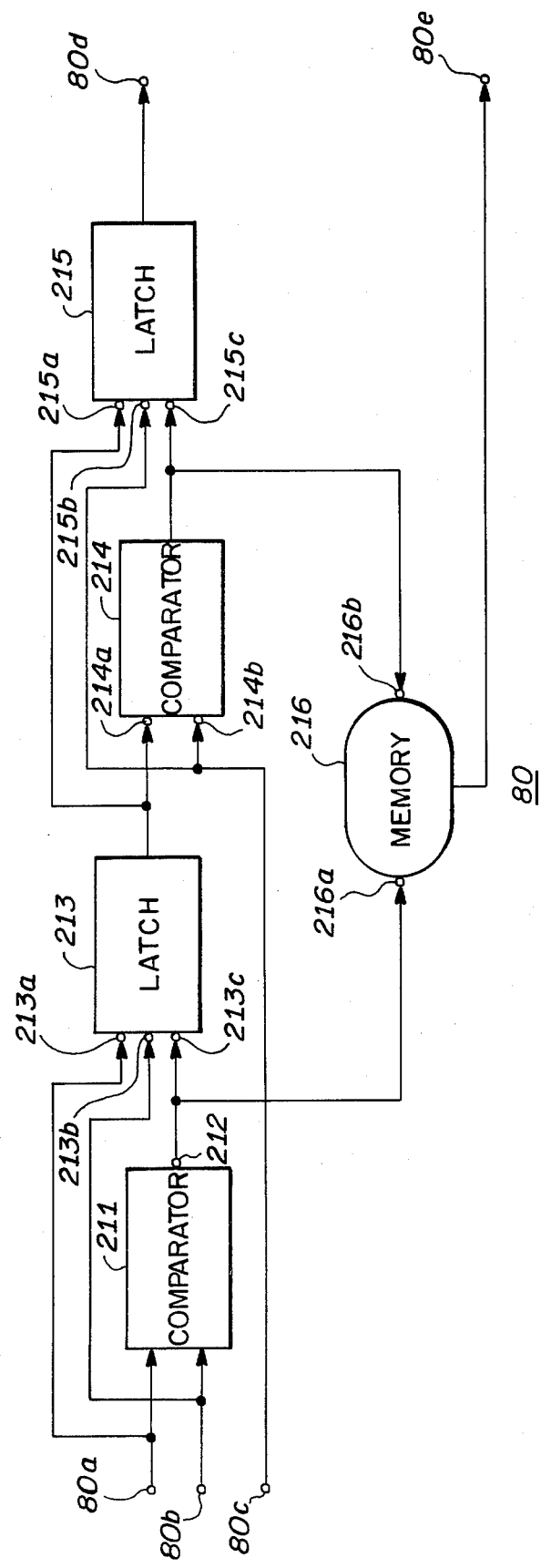
FIG. 6 is a block diagram of a maximum and store circuit suitable for use in the sequence correlator shown in FIG. 4.

Referring to FIG. 6, maximum/store circuit 80 is used to compare and select the maximum of 3 input signals applied to terminals 80a, 80b, and 80c. Comparator 211 compares input signals applied to terminals 80a and 80b called respectively $V_A$ and $V_B$. Comparator 211 compares the signals $V_A$ and $V_B$ such that when $V_A$ is greater than or equal to $V_B$ its output signal will equal a 1, and when $V_A$ is less than $V_B$, the output signal available at terminal 212 equals zero. Latch 213 may be used to store the appropriate signal. Latch 213's operation is as follows. Signals are applied to terminals 213a, 213b and 213c. Input signal data coupled to terminals 80a and 80b is also coupled to latch 213 input terminals 213a and 213b. Control terminal 213c is coupled to comparator output terminal 212, the signal from which is applied to control terminal 213c to determine which of the signals applied to input data terminals 213a and 213b will be stored in latch 213. When the control signal received from comparator 212 equals 1, latch 213 will store the input data signal applied to 213a. If, however, the signal received from comparator output terminal 212 is equal to zero, then latch 213 will store and make available at its output terminal the signal applied to data input terminal 213b. Comparator 214 operates in a similar manner to comparator 211 such that it compares signals applied to its input terminals 214a and 214b. If the signal applied to terminal 214a is greater than or equal to the signal applied to 214b, the output of the comparator will equal 1 while for all other conditions the output of the comparator will equal zero. Latch 215 operates in a manner similar to latch 213 such that input signals are applied to data input terminals 215a and 215b and a control signal received from comparator 214 is coupled to control terminal 215c. Latch 215 will store the signal applied to terminal 215a if the control signal applied to terminal 215c equals 1. If, however, the control signal received from comparator 214 at control terminal 215c equals zero, latch 215 will store data applied to terminal 215b and couple it to its output terminal. In such manner maximum/store circuit 80 as well as maximum/store circuit 81 through 83 will compare and select the maximum of three input signals applied to 80a, 80b and 80c, and couple the maximum number to output terminal 80d. Memory circuit 216 provides an additional function discussed below.

In addition to obtaining $Q_{max}$, the profile sequence may be determined, for possible target and aspect identification by storing the intermediate decisions obtained in Equation 3. The profile sequence may be used to obtain a measure of confidence in the classification indicated by the present invention. For example, if the target profile sequence information indicates a broadside view of the target, yet in fact target observation is head-on, this additional information may be utilized to decide whether or not to accept or discard the information. The most likely aspect sequence was previously given by Equation 5.

Refer now to FIG. 5 and path 200 which traverses the nodes $q_{1,1}, q_{2,2}$, and $q_{3,3}$. For such path assume $n=N=3$; identification of the profile sequence begins by looking at the last node, in other words, $q_{3,3}$. This process may be continued until $q_{2,2}$ and then $q_{1,1}$ all have been observed in turn. Referring again to FIG. 6, it will be noted that memory 216 includes input terminals 216a and 216b which are coupled to output terminals of comparators 211 and 214, respectively. These output terminals, it will be recalled, provide signals indicative of whether or not input signals applied to the input terminals are greater or less than each other. The signal obtained from comparator 211 may be referred to as signal B1 and the signal obtained from comparator 214 may be referred to as signal B2. Memory circuit 216 may be referred to as signal B2. Memory circuit 216 functions such that if both B1 and B2 are one, then the signal applied to terminal 80a was the largest of the signals applied to terminals 80a, 80b and 80c; memory 216 thus generates an output signal corresponding to a −1. This −1 in turn corresponds to $\nu=-1$ indicating that a −1 is added to the k term of the node to obtain the position of the next node. If B1 is zero, and B2 is one, then memory circuit 216 will generate a zero corresponding to $\nu=0$ and indicating that a zero should be added to the profile index (k). In an instance where the signal applied to 80c is largest, then B1 will equal one and B2 will equal zero. In such case, memory circuit 216 will generate a +1 indicating that the 1 is to be added to the profile index k. If the initial decision is made at node $q_{3,3}$, then, by referring to the memory circuit, the most likely previous target aspect can be determined which for path 200 would be $q_{2,2}$. Similarly, the first profile $q_{1,1}$ may be determined from $q_{2,2}$. Thus, in addition to finding the maximum correlation number, the sequence generating the maximum correlation number may be identified.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A range profile target classifier for identifying targets according to a sequence of received range profiles observed at a plurality of aspect angles, said aspect angles having a predetermined aspect angle increment, comprising:
    input means for receiving a multiplicity of discrete range profile data signals, each of said multiplicity corresponding to a discrete look at said target;
    a plurality of profile correlator means coupled to said input means for comparing said received discrete range profile data signals to a plurality of reference profile data signals, each of said profile correlator means corresponding to a predetermined target and each of said reference profile data signals corresponding to a preselected aspect of said predetermined target and for providing a correlation number representative of match between said received and said reference profile data signals;
    a plurality of sequence correlator means coupled to a corresponding one of said plurality of profile correlator means for providing a signal representative of the maximum sum of said correlation numbers obtained from successive looks at said target, said sums selected from looks having aspect angles changing by no more than an integral number of said predetermined aspect angle increment and having no more than one of said aspect angles for each of said looks; and
    maximum detector means coupled to said plurality of sequence correlator means for detecting the largest of said maximum sum signals received from said plurality of sequence correlator means and for providing a signal representative thereof.

2. The apparatus according to claim 1 wherein said maximum detector further comprises means for indicating said sequence.

3. The apparatus according to claim 1 or 2 further comprising input summing means having first and second summing terminals, and an output terminal, said first summing terminal being coupled to said input means, and said output terminal being coupled to said plurality of profile correlator means, for summing signals applied to said summing terminals and for providing a signal representative thereof at said output terminal.

4. The apparatus according to claim 3 wherein said profile correlator comprises a plurality of matched filters, each of said matched filters providing said correlation number indicative of the match between said received range profile signal and a reference range profile signal for a predetermined target observed from a predetermined aspect angle.

5. The apparatus according to claim 4 wherein said integral number of said predetermined aspect angle increment is one.

6. The apparatus according to claim 5 wherein said sequence correlator comprises:
a plurality of summing means having first and second input terminals, said first input terminal coupled to a one of said plurality of matched filters, for summing signals applied to said first and second input terminals;
a plurality of delay means coupled to a corresponding one of said summing means for delaying signals received therefrom by a period equal to time between said looks and for providing a delayed signal indicative thereof;
a plurality of maximum and store means having first, second, and third terminals, each of said terminals coupled to a one of said plurality of delay means wherein said delay means so coupled correspond to sequentially determined aspects of said target, for selecting a maximum of said delayed signal and for providing said maximum signal to an output terminal and for storing said maximum signal, said output terminal being coupled to said summing means second input terminal.

7. The apparatus according to claim 6 wherein a d.c. bias signal is applied to said input summing means second summing terminal.

8. The apparatus according to claim 7 wherein said maximum and store means comprises:
first, second, and third input means for providing first, second and third input signals respectively;
first comparator means having first and second comparator input terminals and an output terminal, said first comparator first input terminal coupled to said first input means, and said first comparator second input terminal coupled to said second input means, for providing a logic one output signal at said output terminal if said first input signal comparator is greater than or equal to said second input signal and for further providing a logic zero output signal if said first input signal is less than said second input signal;
first latch means having first, second, and third input terminals and an output terminal, said first latch input terminal coupled to said first input means, said second latch input terminal coupled to said second input means and said third latch input terminal coupled to said first comparator means output terminal for transferring said first input signal to said first latch output means if a logic one is presented to said first latch third input terminal and for transferring said second input signal if first comparator output signal is a logic zero;
second comparator means having first and second terminals, said second comparator first terminal coupled to said first latch output terminal and said second comparator second input terminal coupled to said third input means, and having an output terminal for providing a logic one output signal at said second comparator output terminal if a signal at said second comparator first input terminal is greater than or equal to a signal at said third input signal, and for further providing a logic zero output signal at said second comparator output terminal if said signal at said second comparator first input terminal is less than said third input signal; and
second latch means having first, second and third input terminals and an output terminal, said second latch first input terminal coupled to said first latch output terminal, said second latch second input terminal coupled to said third input means and said second latch third input terminal coupled to said second comparator output terminal for storing a signal and providing said stored signal at said second latch output terminal, wherein said signal stored in equal to said first latch output signal if said second comparator output signal equals logic one, and said signal stored equals said third input signal if said signal applied to said second latch third input terminal equals logic zero.

9. The apparatus according to claim 8 further comprising memory means having first and second input terminals and an output terminal, said first input terminal being coupled to said first comparator means output terminal and said second input terminal being coupled to said second comparator output terminal, for providing a logic negative one at said memory means output terminal if a logic one is applied to said memory means first and second input terminal, and for providing a logic zero at said memory means output terminal if a logic zero is applied to said memory means first input terminal and a logic one to said memory means second input terminal, and for further providing a one when said signal applied to said memory means first input terminal equals one of said signal applied to said memory means second input terminal equals zero.

10. A method for identifying targets according to a sequence of received range profiles observed at a plurality of aspect angles, said aspect angles having a predetermined aspect angle increment, said method comprising:
receiving a multiplicity of discrete range profile data signals, each of said multiplicity corresponding to discrete look at said target;
comparing said received discrete range profile data signals to a plurality of reference profile data signals, each of said reference profile data signals corresponding to a preselected aspect of said target and further providing a correlation number representative of match between said received and reference range profile data signals;
providing a signal representative of the maximum sum of said correlation numbers obtained from successive looks at said target and corresponding to aspects changing by no more than an integral number of said predetermined aspect angle increment, and having no more than one of said aspect angle for each of said looks; and
detecting the largest of said maximum sum signals and providing a signal representative thereof.

11. The method according to claim 10 wherein the step of comparing comprises multiplying received range profile signals received from a predetermined range by reference range profile signals having a corresponding range; and
summing up the results of said multiplication over said target's range profile.

12. The method according to claim 11 wherein said step of providing a signal representative of the maximum sum of said correlation numbers comprises:

summing said correlation numbers with a preselected signal;

delaying said sum signal by a time period equal to the time between said looks;

selecting the maximum of said delayed signals corresponding to sequentially determined aspects of said target;

storing said selected maximum signal to provide said preselected signal for summation; and selecting the maximum of said selected maximum signal.

13. The method according to claim 12 further comprising the step of summing said discrete range profile data signals with a predetermined d.c. bias voltage.

* * * * *